US011351967B2

(12) United States Patent
Ansaldi

(10) Patent No.: US 11,351,967 B2
(45) Date of Patent: Jun. 7, 2022

(54) WINDSCREEN WASHER SYSTEM

(71) Applicant: Pierluigi Ansaldi, Capannori (IT)

(72) Inventor: Pierluigi Ansaldi, Capannori (IT)

(*) Notice: Subject to any disclaimer, the term of this patent is extended or adjusted under 35 U.S.C. 154(b) by 202 days.

(21) Appl. No.: 16/075,353

(22) PCT Filed: Mar. 14, 2017

(86) PCT No.: PCT/IB2017/051472
§ 371 (c)(1),
(2) Date: Aug. 3, 2018

(87) PCT Pub. No.: WO2017/158512
PCT Pub. Date: Sep. 21, 2017

(65) Prior Publication Data
US 2019/0039576 A1 Feb. 7, 2019

(30) Foreign Application Priority Data
Mar. 15, 2016 (IT) .................. UA2016A001686

(51) Int. Cl.
*B60S 1/50* (2006.01)
*B60S 1/38* (2006.01)
(Continued)

(52) U.S. Cl.
CPC .... *B60S 1/50* (2013.01); *B60S 1/38* (2013.01); *B60S 1/48* (2013.01); *B60S 1/481* (2013.01); *B60S 1/482* (2013.01); *B60S 1/546* (2013.01); *B60S 2001/3827* (2013.01); *C02F 2201/008* (2013.01)

(58) Field of Classification Search
CPC .... B60S 1/546; B60S 1/48; B60S 1/50; B60S 1/482; B60S 1/485; B60S 1/522; B60S 1/524; B60S 1/38; B60S 1/02; B60S 2001/3827; B60S 1/481; C02F 2103/001;
(Continued)

(56) References Cited

U.S. PATENT DOCUMENTS 1,719,444 A * 7/1929 Oishei .................. B60S 1/0402
15/250.3
2,607,065 A * 8/1952 Dahlgren .................. B60S 1/18
15/250.17
(Continued)

FOREIGN PATENT DOCUMENTS

BE 1013204 * 10/2001
CN 204688064 U 10/2015
(Continued)

OTHER PUBLICATIONS

Machine translation of Korean publication 1020110019914, published Mar. 2011. (Year: 2011).*
(Continued)

*Primary Examiner* — Gary K. Graham
(74) *Attorney, Agent, or Firm* — Maier & Maier, PLLC

(57) ABSTRACT

A windscreen washer system for vehicles, in particular for motor vehicles, including at least one rainwater collection element connected to at least one suction pump for collecting rainwater and conveying the same to a collection tank connected in turn to a pump for delivering windscreen washer fluid where the rainwater collection element is integrated in at least one wiper blade.

15 Claims, 2 Drawing Sheets

(51) Int. Cl.
*B60S 1/48* (2006.01)
*B60S 1/54* (2006.01)

(58) Field of Classification Search
CPC . C02F 2201/008; C02F 2307/00; G05D 9/12; B62D 25/081; B60R 16/08
USPC .......... 15/250.04, 250.48, 250.001, 250.361
See application file for complete search history.

(56) References Cited

U.S. PATENT DOCUMENTS

| | | | | |
|---|---|---|---|---|
| 2,770,017 A | * | 11/1956 | Oishei | B60S 1/50 239/284.1 |
| 3,738,575 A | * | 6/1973 | Somer | B60S 1/50 239/284.1 |
| 4,331,295 A | * | 5/1982 | Warihashi | B60S 1/52 239/284.1 |
| 6,236,180 B1 | * | 5/2001 | Contos | B60S 1/485 15/250.02 |
| 10,131,325 B2 | * | 11/2018 | Barr | B60S 1/0818 |
| 2013/0206266 A1 | | 8/2013 | Stenhouse | |
| 2014/0020200 A1 | | 1/2014 | Jacobowitz | |
| 2015/0203075 A1 | * | 7/2015 | Carroll | B60S 1/50 210/95 |
| 2016/0272159 A1 | * | 9/2016 | Barr | B60S 1/02 |
| 2016/0332601 A1 | * | 11/2016 | Carroll | B01D 35/027 |

FOREIGN PATENT DOCUMENTS

| | | | |
|---|---|---|---|
| CN | 204701585 U | | 10/2015 |
| DE | 2705700 | * | 8/1978 |
| DE | 10318752 | * | 11/2004 |
| FR | 2888551 | * | 1/2007 |
| GB | 767 902 A | | 2/1957 |
| KR | 1020110019914 | * | 3/2011 |
| WO | 00/64714 A1 | | 11/2000 |
| WO | WO2007/059926 | * | 5/2007 |

OTHER PUBLICATIONS

Machine translation of Belgium publication 1013204, published Oct. 2001. (Year: 2001).*

Machine translation of description portion of German publication 10318752, published Nov. 2004. (Year: 2004).*

International Search Report and Written Opinion of the International Search Authority dated Jun. 20, 2017 of corresponding International application No. PCT/IB2017/051472; 8 pgs.

Chinese Office Action dated Jun. 9, 2021, in connection with corresponding CN Application No. 201780015025.0 (18 pp., including machine-generated English translation).

* cited by examiner

WINDSCREEN WASHER SYSTEM

FIELD

The present invention relates to a windscreen washer system, in particular for motor vehicles. In particular, the invention relates to a windscreen washer system able to collect rainwater to use it as a windscreen washer fluid.

BACKGROUND

Vehicles are commonly equipped with automatic windscreen washer that spray a diluted detergent on the glass to be washed while at the same time activating the windscreen wipers, which thus deliver the sprayed liquid across the entire surface of the glass and then remove it. In the case of motor vehicles, automatic windscreen washer systems are designed so as to spray the diluted detergent on the front windscreen and possibly also on the rear window.

The Applicant noted that the windscreen washer fluid is kept in a dedicated tank which usually has reduced capacity in order to be located in the engine compartment. This means that the washer fluid contained in the tank runs out quickly, having to then be added frequently so as not to reach the condition of complete exhaustion of the fluid.

The Applicant also considered that in the event of complete exhaustion of the windscreen washer there may occur danger situations, for example in case of sudden partial or complete hiding of the driving visual perspective, as it may occur because of mud squirts from a vehicle forward.

The Applicant has therefore highlighted the need to reduce the frequency of user's intervention required to prevent the complete exhaustion of the washer fluid.

Nowadays, there are already washer systems able to add rainwater to the windscreen fluid in order to reduce the frequency of intervention by a user. However, these systems do not guarantee the collection of particularly clean rainwater, which instead, by going into contact with vehicle parts usually covered with dusty debris, is often murky and dirty. Clearly, a windscreen washer fluid admixed with an additional fluid that is not particularly clean cannot carry out a good cleaning once it is distributed for washing the glass.

SUMMARY

The problem underlying the present invention therefore is to implement a windscreen washer system for vehicles which is able to fill the windscreen washer fluid tank in a substantially autonomous manner and with a fluid actually suitable for washing glasses.

As part of this problem, an object of the present invention is to achieve a windscreen washer system for vehicles which can collect rainwater, treat it appropriately and convey it in the washer fluid tank.

Therefore, according to a first aspect thereof, the invention relates to a windscreen washer system comprising at least one rainwater collection element connected to at least one suction pump for collecting rainwater and conveying the same to a collection tank connected in turn to a pump for delivering windscreen washer fluid and characterised in that the rainwater collection element is integrated in at least one wiper blade.

The positioning of the rainwater collection elements within the windscreen wipers is particularly advantageous as it allows the rainwater flowing on the surface lapped by the wiper to be collected.

The Applicant has, in fact, felt that in this way, particularly clean rainwater can be collected. In fact after a minimum activation lime of the windscreen wiper, the glass surface is already substantially clean and water flowing thereon does not mix with dust or earth residues present on the same.

This implies the possibility of using the water collected as a solvent of the windscreen washer fluid in which a concentrated detergent is dissolved, thereby obtaining a solution equally effective to those currently available on the market.

The present invention may have at least one of the following preferred features; the latter may in particular be combined with each other as desired to meet specific application requirements.

Preferably, the rainwater collection element comprises at least one perforated tube inserted into the at least one wiper blade.

More preferably, each perforated tube is integrated in a wiper Blade so as not to be in contact with the glass on which the windscreen wiper acts.

Preferably, the rainwater collection element is integrated in at least one wiper blade, the wiper blade being made in the form of a tube and provided with a plurality of holes.

Preferably, the at least one perforated tube of the rainwater collection element is hydraulically connected to a suction pump for collecting liquid through the holes of the tube.

More preferably, the suction pump is connected to the at least one tube by means of at least one connecting pipe along which at least one turbidity sensor is arranged.

In this way, it is possible to control the suction pump operation according to the actual level of dirt (measured in terms of turbidity) of the suctioned liquid and activate it when such a liquid has a sufficiently low turbidity.

Even more preferably, at least one filter is interposed along the at least one connecting pipe, suitable for retaining solid impurities present in the suctioned fluid.

Preferably, the filter is arranged upstream of the suction pump with respect to the conveying fluid of the collected liquid.

This can significantly reduce the amount of any residual solid particles suspended in the suctioned liquid in order, on the one hand, to further improve the quality of such a liquid and to prevent clogging of the suction pump on the other.

Preferably, the collection tank comprises a first chamber into which the at least one connecting pipe exits, the first chamber being connected to a second chamber for housing a detergent that can be delivered in the first chamber through a dispenser.

In this way, it is advantageously possible to provide for an automatic dilution of a concentrated detergent in the collected liquid in order to maintain the degree of concentration of detergent in the windscreen washer fluid substantially constant.

More preferably, the first and the second chamber of the collection tank are accessible from outside for topping up the liquids.

Preferably, the collection tank comprises a level sensor suitable for providing a block signal to the suction pump in the event that a first threshold level is exceeded.

In this way, the system is advantageously activated when actually needed, thus avoiding situations of overfilling of the collection tank.

Preferably, the windscreen washer system comprises a rain sensor suitable for providing an activation signal to the suction pump in the event a rain condition is detected.

Alternatively, the windscreen washer system is connected to a rain sensor integrated into the vehicle.

In a particularly advantageous manner, the use of a rain sensor prevents an activation of the windscreen washer when for example the windscreen wipers are activated by mistake. A situation in which the suction pump is activated in the absence of a liquid to be suctioned is thus avoided.

Preferably, the windscreen washer system comprises a switching on means, preferably a manual button or a lever for controlling the windscreen wiper.

Preferably, the rain sensor, the level sensor and the at least one turbidity sensor are connected to a central processing unit adapted to generate a signal to activate the suction pump.

More preferably, the central processing unit is adapted to receive a switching on signal sent through the switching on means or the control lever of the windscreen wiper which activates the level sensor monitoring to verify whether it provides a signal indicative of the filling level of the tank below a first predetermined threshold and, if so, send an activation signal to the suction pump.

Even more preferably, the central processing unit is adapted to send the control signal to the suction pump with a predetermined delay time.

Preferably, the central processing unit is adapted to receive a signal from the rain sensor as regards a rain conditions and therefore send an activation signal to the suction pump.

Preferably, the central processing unit is adapted to receive a signal from the turbidity sensor and send a deactivation to the suction pump if the turbidity signal exceeds a predetermined threshold.

Preferably, the central processing unit is adapted to receive an activation signal of the dispensing pump and consequently send a deactivation signal to the suction pump.

Further features and advantages of the present invention will appear more clearly from the following detailed description of some preferred embodiments thereof, made with reference to the accompanying drawings.

BRIEF DESCRIPTION OF THE DRAWINGS

The different features in the single configurations may be combined with one another as desired according to the description above, to make use of the advantages resulting in a specific way from a particular combination.

In such drawings.

DETAILED DESCRIPTION

Figure 1:
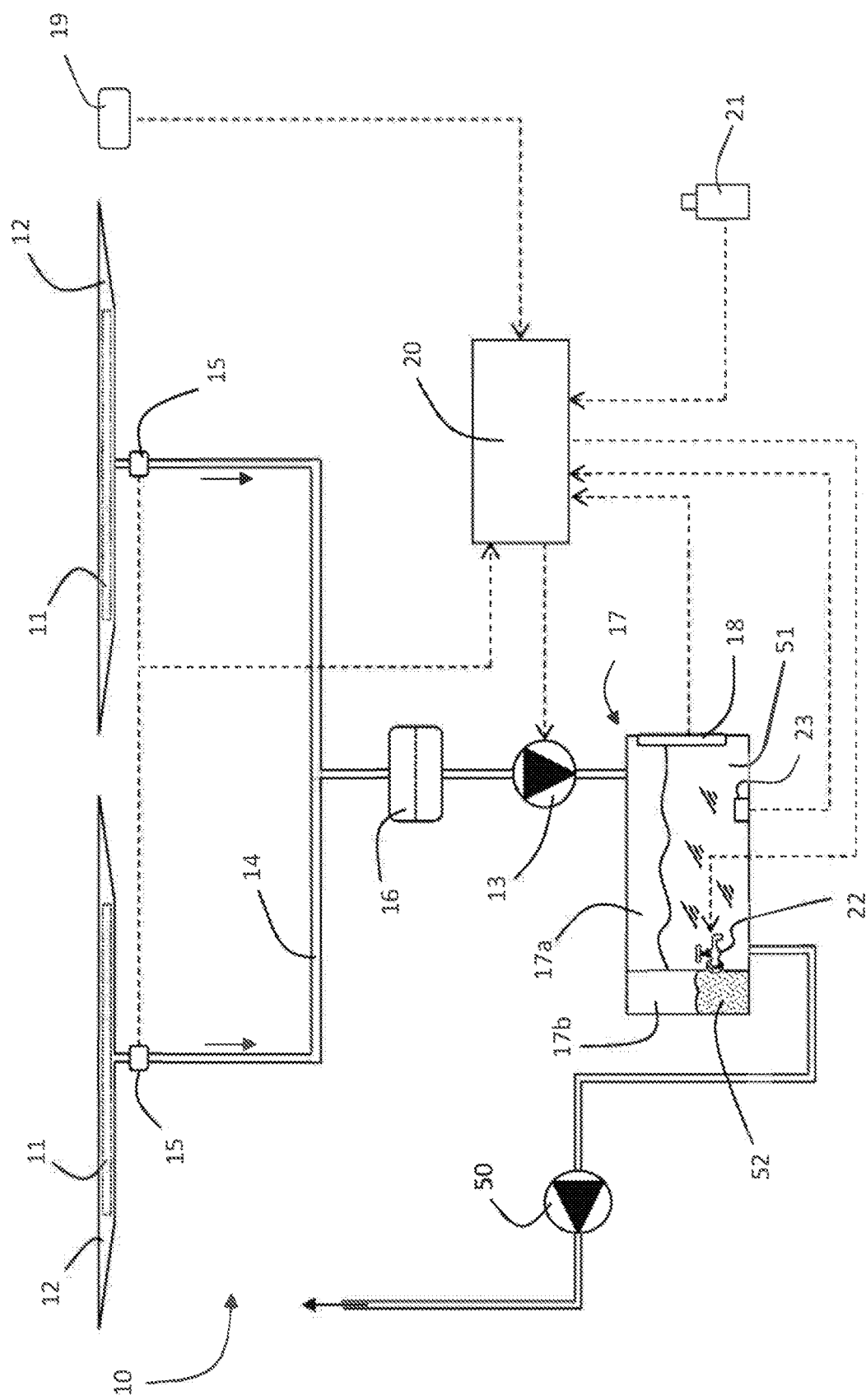
FIG. 1 is a block diagram of a first embodiment of a windscreen washer system for motor vehicles according to the present invention.

In the following description, identical reference numerals are used for the illustration of the figures to indicate construction elements having the same function. Moreover, for clarity of illustration, some numerical references may be not repeated in all the figures.

With reference to FIG. 1, a first embodiment of a windscreen washer system according to the present invention is shown, indicated with reference numeral 10 as a whole.

The windscreen washer system 10 comprises at least one rainwater collection element 11 integrated into the wiper blades 12 of the glass that the system is intended to wash.

In the embodiment shown in FIG. 1, the rainwater collection element 11 comprises a pair of rigid tubes 11, each integrated in a wiper blade 12. In particular, each rigid tube 11 is integrated in a wiper blade 12 so as not to be in contact with the glass in order to prevent any deterioration of the same due to repeated friction.

The rigid tubes 11 are hydraulically connected to a pump 13 for suctioning the liquid with which the rigid tubes come 11 into contact. The suction pump 13 is connected with the rigid tubes 11 by means of special connecting pipes 14 along which at least one turbidity sensor 15 is arranged.

Moreover, at least one filter 16 is interposed along the connecting pipes 14 between the suction pump 13 and the rigid tubes 11, adapted to retain solid impurities present in the suctioned fluid. Filter 16 is arranged upstream of the suction pump 13 with respect to the conveying flow of the liquid collected in order to prevent clogging of the same 13.

The connecting pipes 14 exit into a collection tank 17. In particular, the connecting pipes 14 of rainwater exit into a first chamber 17a of the collection tank 17. The collection tank 17 further comprises a second chamber 17b, separate from the first 17a and connected to the same through a dispenser 22 which can be controlled electronically. A concentrated detergent 52 may for example be introduced in the second chamber 17b which is gradually released into the first chamber 17a so as to keep the dilution of detergent in the washing liquid 51 to a predetermined level. To this end, a concentration sensor 23 is provided in the first chamber 17a of the collection tank 17 which is adapted to determine the degree of dilution of the detergent in the washing liquid 51.

Chambers 17a, 17b of the collection tank 17 are accessible from the outside also by a user in order to add the respective lacking fluids 51, 52, such as if the washing liquid 51 becomes exhausted despite the integration with rainwater, as can happen in a period of great drought.

The first chamber 17a of the collection tank 17 is connected in output in a known manner, to a pump 50 for dispensing the washing fluid 51 on the glass to cleanse.

The first chamber 17a of the collection tank 17 is provided with a level sensor 18 adapted to indicate whether such a first chamber 17a is too full and in that ease prevent the activation of the suction pump 13 and therefore the collection of additional liquid.

Likewise, the level sensor 18 is used to define a minimum level threshold of the liquid contained in the first chamber 17a below which the windscreen washer system 10 is activated to monitor whether the conditions for the collection of rainwater to be added to the first chamber 17a are met.

The windscreen washer system 1 in FIG. 1 further comprises a rain sensor 19 adapted to provide an activation signal of the suction pump 13. Alternatively or additionally, the activation signal of the suction pump 13 is generated following the activation of a control lever of the wiper blade 12 (not shown).

Sensors 15, 18, 19 and 23 of the windscreen washer system 10 are connected to a central processing unit 20 adapted to generate an activation signal to be sent to the suction pump 13 and/or to dispenser 22.

Moreover, the central processing unit 20 is connected in input to a switching on means 21, such as a manual button, for receiving a switching on signal of the windscreen washer system 10, setting it to a condition of standby and monitoring of signals received from the individual sensors 15, 18, 19 and 23 in order to determine the activation of the suction pump 13 and/or of dispenser 22.

Figure 2:
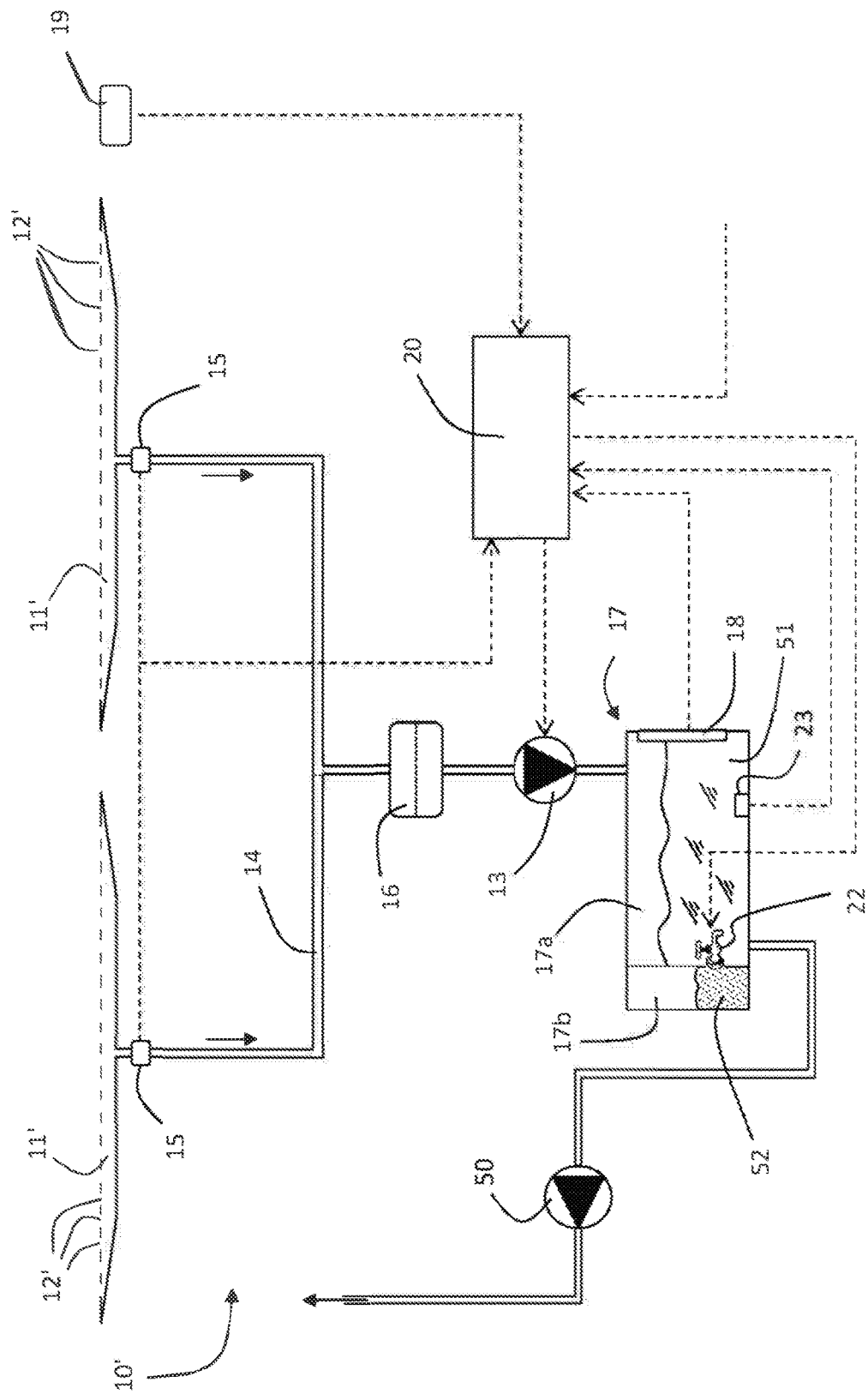
FIG. 2 is a block diagram of a second embodiment of a windscreen washer system for motor vehicles according to the present invention.

A second embodiment shown in FIG. 2 of the windscreen washer system 10' according to the present invention differs from what already described with references to the embodiment in FIG. 1 as the rainwater collection element 11' consists of the wiper blades themselves made as a small tube and provided with a plurality of holes 12'.

Moreover, in this second embodiment, the switching on means is replaced by a control lever of the wiper blade (not shown).

The operation of the windscreen washer system 10, 10' according to the present invention is as follows.

The central processing unit 20 receives a switching on signal imparted through the switching on means 21 and sets to the condition of repeated and/or cyclical monitoring of signals received from sensors 15, 18, 19 and 23 of system 10.

The level sensor 18 provides a signal indicative of the filling level of the collection tank 17. If the level exceeds a first predetermined threshold, the central processing unit 20 does not activate the suction pump 13.

Otherwise, if the filling level is below a second predetermined threshold, which may not be identical to the first threshold, the central processing unit 20 evaluates the signals coming from the additional sensors 15, 19 to impart an activation or deactivation signal to the suction pump 13.

If the rain sensor 19 detects a rain conditions and the control lever of the windscreen wiper is activated, an activation signal of the suction pump 13 is generated.

In particular, the activation signal of the suction pump 13 is generated with a predetermined delay time with respect to the signal coming from the rain sensor 19 and/or from the wiper control lever in order to initiate suction once the initial rain has washed away part of the particles of dirt on the glass.

The liquid suctioned by the suction pump 13 enters into the connecting pipes 14 passing through the rainwater collection element 11 to reach the collection tank 17.

The fluid that flows through the connecting pipes 14 is assessed in terms of turbidity by the corresponding sensors 15 placed at the input of such pipes 14 and a corresponding signal is transmitted to the central processing unit 20. In case of high turbidity, the central processing unit 20 deactivates the suction pump 13 for a predetermined time.

Before reaching and crossing the suction pump 13, the liquid that flows through the connecting pipes 14 is made to pass through filter 16 to retain any solid particles in suspension.

Suction continues until the level of liquid inside the collection tank 17 reaches the first reference threshold of the control lever of the wiper blade is controlled in order to end the action of the wiper blade or, if present, the switching on means 21 imparts a switching off signal.

In addition, the suction is suspended if at least one turbidity sensor 15 detects a condition of excessive turbidity of the suctioned fluid or if the rain sensor 19 does not detect a sufficient amount of rain.

Moreover, the suction is suspended also if during the suction of rainwater, the delivery pump 50 and thus the delivery of the glass washer fluid 51 contained in the first chamber 17a of the collection tank 17 are activated.

The introduction of the suctioned fluid in the collection tank 17 through the windscreen washer system 10 results in a change in the degree of dilution of the fluid present in the first chamber 17a. This is detected by the concentration sensor 23 and reported to the central processing unit 20 which controls the activation of dispenser 22.

Dispenser 22 therefore introduces an amount of concentrated detergent 52 in the first chamber 17a of the collection tank in order to restore the predetermined dilution. The deactivation of dispenser 22 is controlled once the concentration sensor 23 detects that the liquid present in the first chamber 17a of the collection tank 17 has again reached the predetermined degree of dilution.

According to the alternative embodiment in FIG. 2, in which the switching on means 21 is not present, the central processing unit 20 is activated directly by the activation of the control lever of the wiper. Once the activation signal has been received, the central processing unit 20 checks the signal from the rain sensor 19 and from the level sensor 18 and, if necessary, provides an activation command to the suction pump 13 with a predetermined delay as described above.

The features of the windscreen wiper system object of the present invention as well as the relevant advantages are clear from the above description.

Additional variants of the embodiments described above are possible without departing from the teaching of the invention.

Finally, it is clear that several changes and variations may be made to the windscreen wiper system thus conceived, all falling within the invention; moreover, all details can be replaced with technically equivalent elements. In the practice, both the materials used and the sizes can be modified according to the technical requirements.

The invention claimed is:
1. A windscreen washer system comprising:
at least one rainwater collection element connected to at least one suction pump for collecting rainwater and conveying the same to a collection tank connected in turn to a pump for delivering windscreen washer fluid, wherein the rainwater collection element is integrated in at least one wiper blade;
a central processing unit configured to receive an activation signal of the at least one suction pump, the central processing unit being connected to at least one of:
at least one rain sensor that provides the activation signal of the at least one suction pump in the event a rain condition is detected; and
a lever for controlling a windscreen wiper that provides the activation signal of the at least one suction pump following the activation of the lever;
wherein the at least one suction pump is connected to the rainwater collection element by at least one connecting pipe;
wherein the central processing unit is further connected to:
at least one turbidity sensor configured to provide a signal indicative of a turbidity of a fluid flowing through the at least one connecting pipe; and
at least one level sensor configured to provide a signal indicative of a filling level of the collection tank;
wherein the central processing unit is configured to transmit the activation signal to the at least one suction pump after a delay time with respect to a generation of the activation signal of the at least one suction pump by the rain sensor and/or the wiper control lever; and
wherein the central processing unit is configured to transmit the activation signal to the at least one suction pump based on signals received from the at least one turbidity sensor and the at least one level sensor and based on the absence of an activation signal of the pump for delivering windscreen washer fluid.
2. The windscreen washer system of claim 1, wherein the at least one rainwater collection element comprises at least one perforated tube inserted in the at least one wiper blade.

3. The windscreen washer system of claim 2, wherein the at least one perforated tube of the at least one rainwater collection element is hydraulically connected to a suction pump for collecting liquid through a plurality of holes of the tube.

4. The windscreen washer system of claim 3, wherein the at least one suction pump is connected to the at least one tube by the at least one connecting pipe and wherein the at least one turbidity sensor is arranged along the at least one connecting pipe.

5. The windscreen washer system of claim 1, wherein at least one filter is interposed along the at least one connecting pipe, the at least one filter being adapted to retain solid impurities present in the fluid.

6. The windscreen washer system of claim 1, wherein the collection tank comprises the at least one level sensor and wherein the at least one level sensor provides a block signal for the at least one suction pump in the event a first threshold level is exceeded.

7. The windscreen washer system of claim 1 comprising a manual button configured to generate a switching on signal of the windscreen washer system.

8. The windscreen washer system of claim 1, wherein:
the collection tank comprises a first chamber into which the at least one connecting pipe exits, the first chamber being connected to a second chamber for housing a detergent that is delivered in the first chamber through a dispenser;
a concentration sensor is provided in the first chamber and configured to detect a degree of dilution of the detergent in a liquid present in the first chamber; and
the detergent is gradually released into the first chamber so as to keep the dilution of the detergent in the liquid to a predetermined level.

9. A windscreen washer system comprising: at least one rainwater collection element connected to at least one suction pump for collecting rainwater and conveying the same to a collection tank connected in turn to a pump for delivering windscreen washer fluid, wherein the rainwater collection element is integrated in at least one wiper blade, the wiper blade comprising at least one tube provided with a plurality of holes;
a central processing unit configured to receive an activation signal of the at least one suction pump, the central processing unit being connected to at least one of:
at least one rain sensor that provides the activation signal of the at least one suction pump in the event a rain condition is detected; and
a lever for controlling a windscreen wiper that provides the activation signal of the at least one suction pump following the activation of the lever;
wherein the at least one suction pump is connected to the rainwater collection element by at least one connecting pipe;
wherein the central processing unit is further connected to:
at least one turbidity sensor configured to provide a signal indicative of a turbidity of a fluid flowing through the at least one connecting pipe; and
at least one level sensor configured to provide a signal indicative of a filling level of the collection tank;
wherein the central processing unit is configured to transmit the activation signal to the at least one suction pump after a delay time with respect to a generation of the activation signal of the at least one suction pump by the rain sensor and/or the wiper control lever; and
wherein the central processing unit is configured to transmit the activation signal to the at least one suction pump based on signals received from the at least one turbidity sensor and the at least one level sensor and based on the absence of an activation signal of the pump for delivering windscreen washer fluid.

10. The windscreen washer system of claim 9, wherein the at least one tube of the at least one wiper blade is hydraulically connected to the at least one suction pump for collecting liquid through the holes of the tube.

11. The windscreen washer system of claim 10, wherein the at least one suction pump is connected to the at least one tube by the at least one connecting pipe and wherein the at least one turbidity sensor is arranged along the at least one connecting pipe.

12. The windscreen washer system of claim 9, wherein at least one filter is interposed along the at least one connecting pipe, the at least one filter being adapted to retain solid impurities present in the fluid.

13. The windscreen washer system of claim 8, wherein the collection tank comprises the at least one level sensor and wherein the at least one level sensor is configured to provide a block signal for the at least one suction pump when a first threshold level is exceeded.

14. The windscreen washer system of claim 9 comprising a manual button configured to generate a switching on signal of the windscreen washer system.

15. The windscreen washer system of claim 8, wherein:
the collection tank comprises a first chamber into which the at least one connecting pipe exits, the first chamber being connected to a second chamber for housing a detergent that is delivered in the first chamber through a dispenser;
a concentration sensor is provided in the first chamber and configured to detect a degree of dilution of the detergent in a liquid present in the first chamber; and
the detergent is gradually released into the first chamber so as to keep the dilution of the detergent in the liquid to a predetermined level.

* * * * *